US009699759B1

United States Patent
Liu et al.

(10) Patent No.: US 9,699,759 B1
(45) Date of Patent: Jul. 4, 2017

(54) METHOD AND DEVICE FOR DETECTING FALSE MOVEMENT OF A MOBILE DEVICE

(71) Applicant: MARVELL INTERNATIONAL LTD., Hamilton (BM)

(72) Inventors: BoChih Liu, Shanghai (CN); Zhike Jia, Fremont, CA (US); Jing Yu, Shanghai (CN); Jian Chen, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/056,135

(22) Filed: Feb. 29, 2016

Related U.S. Application Data

(60) Provisional application No. 62/138,046, filed on Mar. 25, 2015.

(51) Int. Cl.
  *H04W 64/00*  (2009.01)
  *G01P 15/18*  (2013.01)

(52) U.S. Cl.
  CPC ............. *H04W 64/00* (2013.01); *G01P 15/18* (2013.01)

(58) Field of Classification Search
  CPC .............................. H04W 64/00; G01P 15/18
  See application file for complete search history.

(56) References Cited

U.S. PATENT DOCUMENTS

| | | | | |
|---|---|---|---|---|
| 8,065,508 B2* | 11/2011 | Rubin | ............... | H04M 1/72563 713/1 |
| 8,131,465 B2* | 3/2012 | Eitan | ...................... | G01S 19/34 340/573.1 |
| 8,543,135 B2* | 9/2013 | Goyal | ................... | H04W 12/08 340/669 |
| 2003/0109258 A1* | 6/2003 | Mantyjarvi | .............. | A61B 5/11 455/440 |
| 2007/0057779 A1* | 3/2007 | Battista | .................... | G01S 19/34 340/425.5 |
| 2011/0071759 A1* | 3/2011 | Pande | .................. | G01C 21/165 701/469 |
| 2012/0289244 A1* | 11/2012 | Goyal | ................... | H04W 12/08 455/456.1 |
| 2013/0102268 A1* | 4/2013 | Wang | ...................... | G01S 19/34 455/343.2 |
| 2014/0073345 A1* | 3/2014 | Chintalapudi | ....... | G01C 21/165 455/456.1 |
| 2014/0274151 A1* | 9/2014 | Pattabiraman | ........ | H04W 4/043 455/456.3 |

(Continued)

*Primary Examiner* — Nathan Mitchell

(57) ABSTRACT

Aspects of the disclosure provide a method for detecting false movement of a device. The method includes receiving acceleration signals from a 3-axis accelerometer of a mobile device that are indicative of a movement of the mobile device over a window of time. The acceleration signals can include a first signal, a second signal, and a third signal corresponding to three axes of the 3-axis accelerometer. The method further includes calculating a standard deviation (SD) value for each of the acceleration signals over the window of time, determining whether the movement of the mobile device is a false movement that does not substantially change a geographic location of the mobile device based on the calculated SD values, and when the movement of the mobile device is not a false movement, triggering a location updating process for the mobile device.

16 Claims, 5 Drawing Sheets

(56) References Cited

U.S. PATENT DOCUMENTS

| | | | |
|---|---|---|---|
| 2015/0154868 A1* | 6/2015 | Neuner | G01C 21/3685 340/932.2 |
| 2015/0271782 A1* | 9/2015 | Ljung | H04W 68/02 455/456.1 |

* cited by examiner

US 9,699,759 B1

METHOD AND DEVICE FOR DETECTING FALSE MOVEMENT OF A MOBILE DEVICE

INCORPORATION BY REFERENCE

This present disclosure claims the benefit of U.S. Provisional Application No. 62/138,046, "Method for Identifying Position Updating Occasions with Minimum Error Movement Detection" filed on Mar. 25, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Some mobile devices perform location updating operations periodically based on a periodic time interval, regardless of the user is moving or stationary. This type of location updating method leads to unnecessary consumption of power and network resources when a user of a mobile device is motionless for a long time. In addition, when the user of the mobile device moves during the period of the periodic time interval, a location updating opportunity cannot be identified immediately.

SUMMARY

Aspects of the disclosure provide a method. The method includes receiving acceleration signals from a 3-axis accelerometer of a mobile device that are indicative of a movement of the mobile device over a window of time, the acceleration signals including a first signal, a second signal, and a third signal corresponding to three axes of the 3-axis accelerometer, calculating a standard deviation (SD) value for each of the acceleration signals over the window of time, determining whether the movement of the mobile device is a false movement that does not substantially change a geographic location of the mobile device based on the SD values of each acceleration signal, and when the movement of the mobile device is not a false movement, triggering a location updating process for the mobile device.

In an embodiment, determining whether the movement of the mobile device is false movement based on the SD values of each acceleration signal includes determining whether at least one of the SD values of each acceleration signal exceeds a first threshold, and when at least one of the SD values of each acceleration signal exceeds the first threshold, identifying the movement of the mobile device as false movement.

In another embodiment, determining whether the movement of the mobile device is false movement based on the SD values of each acceleration signal further includes, when none of the SD values of each acceleration signal exceeds the first threshold, determining whether the SD value of the first signal exceeds a second threshold, the second threshold being less than the first threshold. When the SD value of the first signal exceeds the second threshold, determining whether the SD value of the first signal is less than the SD value of the second signal plus a first constant, or less than the SD value of the third signal plus the first constant, and when the SD value of the first signal is less than the SD value of the second signal plus the first constant, or less than the SD value of the third signal plus the first constant, identifying the movement of the mobile device as false movement.

In addition, when the SD value of the first signal is less than the second threshold, determining whether the SD value of the first signal is less than the SD value of the second signal plus a second constant, or less than the SD value of the third signal plus the second constant, and when the SD value of the first signal is less than the SD value of the second signal plus the second constant, or less than the SD value of the third signal plus the second constant, identifying the movement of the mobile device as false movement.

In a further embodiment, determining whether the movement of the mobile device is false movement based on the SD values of each acceleration signal further includes, when the SD value of the first signal exceeds the SD value of the second signal plus the first constant, and exceeds the SD value of the third signal plus the first constant, or when the SD value of the first signal exceeds the SD value of the second signal plus the second constant, and exceeds the SD value of the third signal plus the second constant, determining whether the SD values of any two of the acceleration signals exceed a third threshold, the third threshold is less than the first threshold but exceeds the second threshold. When the SD values of any two of the acceleration signals exceed a third threshold, identifying the movement of the mobile device as false movement.

In a further embodiment, determining whether the movement of the mobile device is false movement based on the SD values of each acceleration signal further includes, when at least one of the SD values of every two of the acceleration signals do not exceed the third threshold, determining whether the SD values of each acceleration signal all exceed the second threshold, or are less than a fourth threshold, the fourth threshold is less than the second threshold. When the SD values of each acceleration signal all exceed the second threshold, or are less than the fourth threshold, identifying the movement of the mobile device as false movement. When not all of the SD values of each acceleration signal exceed the second threshold, and not all of the SD values of each acceleration signal are less than the fourth threshold, identifying the movement of the mobile device as not false movement.

In an embodiment, calculating the standard deviation (SD) value for each of the acceleration signals includes converting the acceleration signals from analog signals to acceleration data, filtering the acceleration data to generate filtered acceleration data, and calculating SD values for each of the acceleration signals based on the filtered acceleration data.

In an embodiment, the method further includes monitoring the acceleration signals to detect the movement of the mobile device, and, when the movement of the mobile device is detected, initiating a process for determining whether the movement of the mobile device is false movement.

Aspects of the disclosure provide a device. The device includes a digital signal processor to receive acceleration signals from a 3-axis accelerometer of a mobile device that are indicative of a movement of the mobile device over a window of time, and calculate a standard deviation (SD) value for each of the acceleration signals over the window of time, the acceleration signals including a first signal, a second signal, and a third signal corresponding to three axes of the 3-axis accelerometer, and a movement detector to determine whether the movement of the mobile device is a false movement that does not substantially change a geographic location of the mobile device based on the calculated SD values, and, when the movement of the mobile device is not a false movement, trigger a location updating process for the mobile device.

Aspects of the disclosure provide a mobile device. The mobile device includes a 3-axis accelerometer to generate acceleration signals that are indicative of a movement of the mobile device over a window of time, a movement detecting unit to determine whether the movement of the mobile device is a false movement that does not substantially change a geographic location of the mobile device based on the acceleration signals, and trigger a location updating process for the mobile device when the movement of the mobile device is not a false movement, a location updating controller to perform the location updating process when triggered by the movement detecting unit, and positioning circuitry to determine a current location of the mobile device when triggered by the location updating controller.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
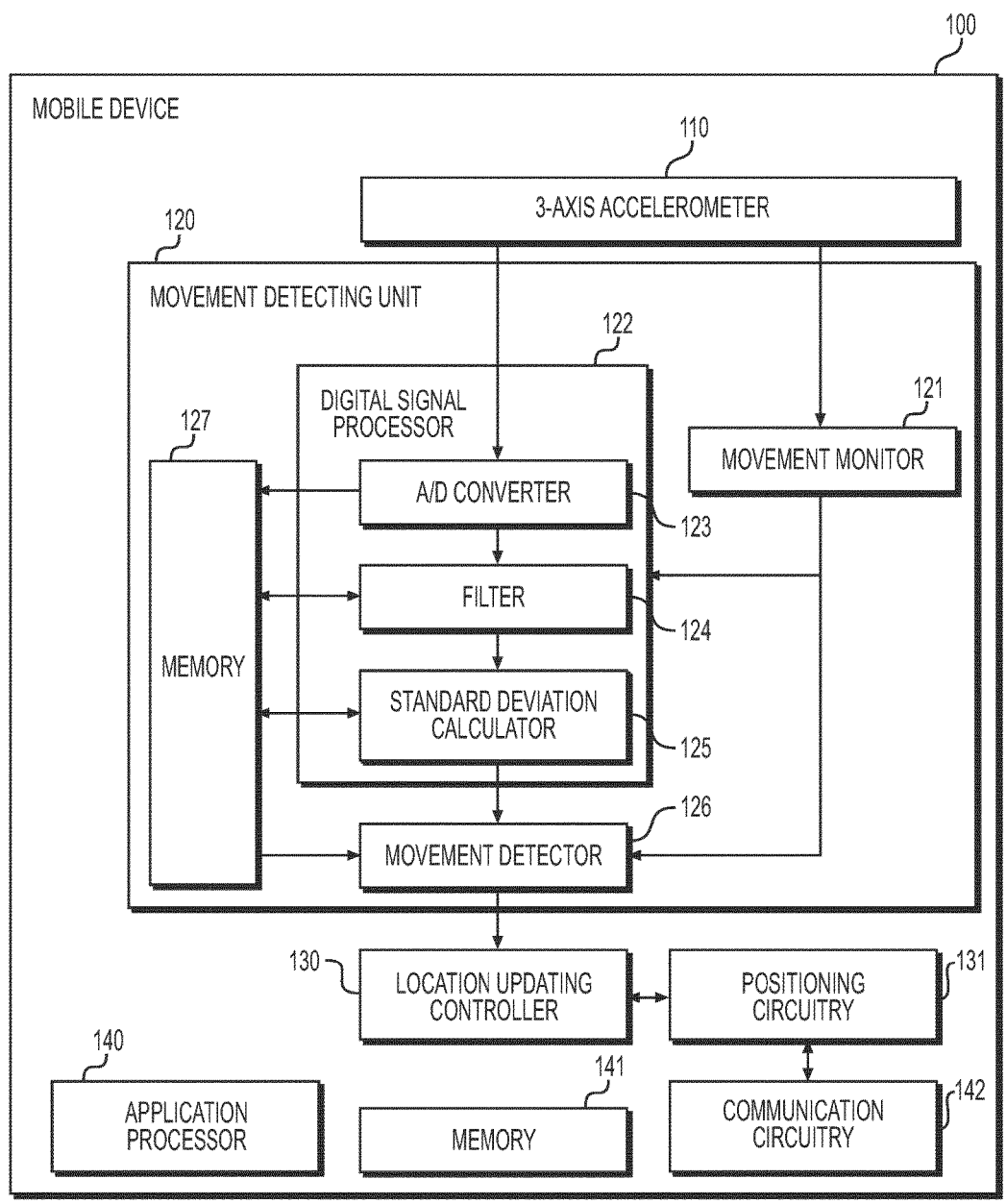
FIG. 1 shows a mobile device according to an embodiment of the disclosure.

FIG. 1 shows a mobile device 100 according to an embodiment of the disclosure. The mobile device 100 includes, but is not limited to, a 3-axis accelerometer 110, a movement detecting unit (MDU) 120, a location updating controller 130, a positioning circuitry 131, an application processor 140, a memory 141 and communication circuitry 142. These components are coupled together as shown in FIG. 1.

The mobile device 100 can be a mobile phone, a tablet computer, a laptop, a wearable device, and the like. In addition, the mobile device 100 can include applications that provide location based services (LBS) to a user of the mobile device. For example, the LBS can include providing location related information, such as advertisements, points of interest, weather forecast, and the like, to the user. When geographic location of the mobile device 100 changes, the mobile device 100 can perform a location updating process to update the geographic location of the mobile device in order to enable the LBS applications to perform their functions properly.

The mobile device 100 can be in different motion modes according to activities performed by a user of the mobile device 100. For example, the mobile device 100 can be in a static mode when the mobile device is stationary, e.g., the user leaves the mobile device 100 on a table. The mobile device 100 can be in a moving mode when the user performs activities such as reading information from the mobile device 100 while sitting and holding the mobile device 100, or walking while carrying the mobile device. When the mobile device 100 is in the moving mode, the movements of the mobile device 100 can be divided into two types of movements: real movements and false movements.

A real movement refers to a movement of the mobile device 100 that changes geographic location of the mobile device 100. For example, when the user performs activities such as walking, running, or driving while carrying the mobile device 100, movements of the mobile device 100 caused by the user's activities change the geographic location of the mobile device 100 accordingly.

To the contrary, a false movement refers to a movement of the mobile device that does not substantially change geographic location of the mobile device 100. For example, the mobile device 100 is a mobile phone with a touch screen, and the user of the mobile phone, while sitting on a chair in an office, may pick up the mobile phone and operate on the touch screen to check email, play a game, make a phone call, or randomly shake the mobile phone. The movements of the mobile phone caused by the above user's activities may cause minor changes to the geographic location of the mobile phone, but do not substantially change the geographic location of the mobile phone.

According to an aspect of the disclosure, the MDU 120 can detect a movement of the mobile device 100 based on acceleration signals received from the 3-axis accelerometer 110. Specifically, the MDU 120 can determine whether the movement of the mobile device 100 is a real movement or a false movement. Subsequently, when a real movement is determined, the MDU 120 can trigger the location updating controller 130 to perform a location updating process for the mobile device 100. When a false movement is determined, the location updating process is not triggered. As a result, power consumption and network resources related with the location updating process can be saved.

The 3-axis accelerometer 110, also referred to as a 3-axis acceleration sensor, detects and measures acceleration of the mobile device 100, and generates acceleration signals that are indicative of a movement of the mobile device 100. In an example, the 3-axis accelerometer 110 includes three accelerometers to detect accelerations of the mobile device 100 along x-axis, y-axis, and z-axis of the local coordinate system of the 3-axis accelerometer 110. Accordingly, the acceleration signals can include three acceleration signals corresponding to the three axes of the 3-axis accelerometer 110 and indicating accelerations along the three axes. In an example, the 3-axis accelerometer 110 is made using micro-electro-mechanical systems (MEMS) technology, and generates analog acceleration signals.

The 3-axis accelerometer 110 is installed in the mobile device 100 with an orientation that the coordinate system of the 3-axis accelerometer 110 agrees with the coordinate system of the mobile device 100 in terms of directions of the axes in the two coordinate systems. For example, the mobile device 100 can be a mobile phone with a touch screen. The mobile phone can have a local coordinate system in which the x-axis is in the plane of the screen and vertical to a side of the screen, the y-axis is also in the plane of the screen and vertical to another side of screen, and the z-axis is perpendicular to the screen. Accordingly, the directions of the x-axis, y-axis, and z-axis of the 3-axis accelerometer 110 agree with the directions of the x-axis, y-axis, and z-axis of the mobile phone, respectively. As a result, the acceleration signals indicate accelerations of the mobile device 100 along the three axes of the coordinate system of the mobile device 100, and are used to detect the movement of the mobile device 100.

The 3-axis accelerometer 110 can generate acceleration signals with different amplitudes corresponding to the static mode or the moving mode of the mobile device 100. For example, when the mobile device 100 is in static mode, the acceleration signals change over time in a small range, for example, the amplitudes of each acceleration signal are smaller than a threshold, while when the mobile device 100 is in moving mode, acceleration signals can change over time in a large range, for example, the amplitudes of one or more of the acceleration signals are larger than the threshold.

The MDU 120 performs a process to determine whether a movement of the mobile device 100 is a real movement or a false movement based on the acceleration signals received from the 3-axis accelerometer 110, and trigger a location updating process for the mobile device 100 when the movement of the mobile device 100 is not a false movement. In an embodiment, the MDU 120 includes a movement monitor 121, a digital signal processor 122, a movement detector 126 and a memory 127.

In an embodiment, the movement monitor 121 monitors the acceleration signals received from the 3-axis accelerometer 110 to detect a movement of the mobile device 100. In an example, the movement monitor 121 continually samples the acceleration signals and checks the amplitudes of each of the acceleration signals. As described above, the acceleration signals corresponding to the moving mode and the static mode can have different amplitudes. When the amplitude of at least one of the acceleration signals larger than the threshold is detected, the movement monitor 121 determines that the mobile device 100 is in a moving mode.

Accordingly, the movement monitor 121 initiates the process for determining whether the movement of the mobile device 100 is a real movement or a false movement when the movement of the mobile device 100 is detected. Alternatively, when a moving mode of the mobile device 100 is not detected (e.g., the mobile device 100 is in a static mode), the movement monitor 121 continues to monitor the acceleration signals.

After a movement of the mobile device 100 is detected as described above, the digital signal processor 122 receives the analog acceleration signals over a window of time from the 3-axis accelerometer 110. The analog acceleration signals over a window of time indicate a movement of the mobile device 100. In an example, the window of time has a size in a range of 1-10 seconds. The acceleration signals can include a first signal, a second signal, and a third signal corresponding to the three axes of the 3-axis accelerometer 110. The directions of each axis of the 3-axis accelerometer 110 relative to the earth coordinate system can vary depending on the orientation of the mobile device 100.

The digital signal processor 122 processes the received acceleration signals over the window of time to calculate standard deviation (SD) values of each of the acceleration signals. SD describes variation or dispersion of a set of data points. An SD value close to 0 indicates that the data points tend to be close to the mean of the data set, while an SD value with a higher value indicates that the data points are spread out over a wider range of values.

In an embodiment, the digital signal processor 122 includes an analog to digital (A/D) converter 123, a filter 124, and an SD calculator 125. The A/D converter 123 samples each signal included in the analog acceleration signals over the window of time at a sampling rate and generates digital acceleration data corresponding to each signal over the window of time. The acceleration data corresponding to each signal includes a time sequence of readings and each reading corresponds to a sample of the each signal. In an example, the sampling rate is in a range of 20 Hz-100 Hz and each sample is represented with 8 bits. In one example, the A/D converter 123 transmits the generated acceleration data to the filter 124 while sampling, while in another example, the acceleration data is stored in the memory 127 for later use of the filter 124.

The filter 124 removes high frequency components from the acceleration data corresponding to each signal. Typically, in the acceleration signals, most (e.g., 90%) of frequency components indicating movements of the mobile device 100 caused by activities of the user are below 20 Hz. The acceleration data with high frequency components being removed can better reflect the movements of the mobile device. In an example, a low pass finite impulse response (FIR) filter with a cut-off frequency of 20 Hz is used to process the acceleration data. In an example, the filter 124 stores the filtered acceleration data in the memory 127 for later user of the SD calculator 125.

The SD calculator 125 calculates SD values of each of the acceleration signals over the window of time using the filtered acceleration data. In an example, the SD values of each of the acceleration signals are calculated using the following formula, $$\sigma = \sqrt{\frac{1}{N}\sum_{i=1}^{N}(x_i - \bar{x})^2},$$

where $\sigma$ represents an SD value, N represents the number of readings (samples) of filtered data over a window of time corresponding to one of the acceleration signals, $x_i$ represents a reading of the filtered data, and $\bar{x}$ represents a mean of all the readings in the filtered data. In an example, the SD calculator 125 stores the calculated SD values in the memory 127 for later use of the movement detector 126.

The movement detector 126 performs a process to determine whether the movement of the mobile device 100 indicated by the acceleration signals is a false movement or a real movement based on the SD values of the acceleration signals. The process is described in detail with reference to a flow chart in FIG. 4.

Subsequently, when the movement detector 126 determines that the movement of the mobile device 100 is not a false movement, the movement detector 126 triggers a location updating process for the mobile device 100. In an example, the movement detector 126 transmits a signal to the location updating controller 130 and triggers the location updating controller 130 to perform the location updating process for the mobile device 100. When the movement of the mobile device 100 is a false movement, the movement detector 126 does not trigger the location updating process. In this way, power consumption and network resources are not wasted because the location updating process. In addition, after the movement detector 126 determines the movement of the mobile device 100 is a false movement or a real movement, the movement monitor 121 can continue to monitor the acceleration signals generated from the 3-axis accelerometer 110. Once a movement of the mobile device 100 is detected again, the movement monitor 121 can again initiate the process to determine whether the movement of the mobile device is a real movement or a false movement as described above.

The memory 127 stores data generated from the digital signal processor 122. In an example, the A/D converter 123 generates the acceleration data corresponding to each signal of the acceleration signals generated at the 3-axis accelerometer 110 and stores the acceleration data corresponding to each signal in the memory 127. The filter 124 reads the acceleration data from the memory 127, and subsequently generates filtered acceleration data and stores the filtered acceleration data in the memory 127. The SD calculator 125 reads the filtered acceleration data from the memory 127, and subsequently calculates SD values of each of the acceleration signals and stores the SD values in the memory 127. Based on the SD values stored in the memory 127, the movement detector 126 determines whether a movement of the mobile device 100 is a false movement. The memory 127 can be a random access memory (RAM), a flash memory, and the like, in various embodiments.

The MDU 120 can be implemented using any suitable software, hardware, or a combination of software and hardware in various embodiments. The software can include computer-executable instructions that are stored in the memory 141 and when executed by the application processor 140 perform the functions of the MDU 120 described above. The hardware can be one or multiple discrete circuits or integrated circuits (ICs). The IC can be an application-specific integrated circuit (ASIC), a Field-programmable gate arrays (FPGAs), and the like.

The location updating controller (LUC) 130 performs the location updating process when triggered by the MDU 120. Specifically, the LUC 130 can transmit a signal to the positioning circuitry 131 to trigger the positioning circuitry 131 to determine a current location of the mobile device 100, for example, indicated by latitude, longitude and elevation in a geographic coordinate system. Subsequently, the LUC 130 can receive information of the current location, and update location information with the information of the current location. In an example, the location information is stored in the memory 141. After the updating of the location information, the LUC 130 can wait for another triggering signal transmitted from the MDU 120 before performing another location updating process.

The positioning circuitry 131 determines the current location of the mobile device 100 when triggered by the LUC 130 and transmits the information of the current location to the LUC 130. The information of the current location can be expressed as geographic coordinates such as latitude, longitude and elevation, or other suitable format in various examples. The positioning circuitry 131 can employ various technologies to fulfill its function in various embodiments. For example, the positioning circuitry 131 can include one or multiple positioning systems, such as a satellite-based positioning system, a radio-based positioning system, or other suitable navigation systems. Different positioning systems can be preferably used under different environmental situations In an example, the positioning circuitry 131 includes a satellite signal receiver configured to receive positioning signals from a satellite system, such as the GPS, the GLObal NAvigation Satellite System (GLONASS), the Galileo navigation satellite system, the Beidou navigation satellite system, and the like. The receiver can calculate the distances between the satellites and the mobile device 100 based on the time difference between the transmitted and the received radio signals from the satellites, and subsequently determine the current location of the mobile device 100.

In another example, the positioning circuitry 131 uses a radio-based positioning system to determine the current location of the mobile device 100. The radio-based positioning system can receive signals, via the communication circuitry 142, from different base stations in a wireless network, such as a wireless local area network (WLAN) or a wireless cellular network. Based on received signal strength indicators (RSSI) of the received signals, the radio-based positioning system can calculate distances from the mobile device 100 and the different base stations to obtain the current location. The RSSI is a measurement of the power present in a received radio signal.

In a further example, the positioning circuitry 131 uses another radio-based positioning system to determine the current location of the mobile device 100. In the other radio-based positioning system, the received RSSIs above corresponding to the current location forms a fingerprint of the current location, and the fingerprint is transmitted to a remote server storing a database of fingerprints indicating different locations in an area. The remote server can match the received fingerprint with the fingerprints in the database to determine the current location.

After the transmission of the information of the current location, the positioning circuitry 131 can wait for another triggering signal transmitted from the LUC 130 before performing another current-location determining process.

The memory 141 stores computer-readable instructions or program modules of various software, such as the applications providing LBSs, software for implementing, with or without other hardware, functions of the MDU 120, the LUC 130, the positioning circuitry 131, or the communication circuitry 142. The memory 141 can use a variety of computer storage media in various embodiments, such as random access memory (RAM), read-only memory (ROM), electrically erasable programmable read-only memory (EEPROM), flash memory, compact disc read-only memory (CD-ROM), digital versatile disk (DVD) or other optical disk storage, magnetic cassettes, magnetic tape, magnetic disk storage, and the like.

The application processor 140 executes computer-readable instructions or program modules stored in the memory 141 to perform various functions of the components of the mobile device 100 as described above. In addition, the application processor 140 can execute computer-readable instructions of other software applications installed in the mobile device 100.

The communication circuitry 142 provides communication channels for the components in the mobile device 100 to communicate with other computers or devices via various communication networks. In an example, the other computers or devices include the remote server storing the database of fingerprints indicating different locations in an area. In another example, the other computers or devices include a server where location-based service information, such as point of interest information, or promotion information, and the like, is stored, and the mobile device 100 can communicate with the server to receive the location-based service information. The various communication networks can include WLANs, wired-LANs, wireless cellular networks, Internet, wide-area networks, and the like, and accordingly, the communication circuitry 142 can operate with various communication protocols, such as WiFi, Bluetooth, Internet protocols, wireless cellular network protocols (e.g. general packet radio service (GPRS), wideband code division multiple access (WCDMA), Long-Term Evolution (LTE)), any other communication protocols, or any combination thereof.

In addition, the communication circuitry 142 receives wireless signals from different base stations in a wireless network, such as a wireless local area network (WLAN) or a wireless cellular network, and provides RSSIs needed by a radio-based positioning system to the positioning circuitry 131. In an example, the communication circuitry 142 includes an antenna configured to receive or transmit wireless signals to support the wireless communications performed by the communication circuitry 142.

The mobile device 100 may include other components (not shown), such as a touch panel, a display device, or other input/output devices, in various embodiments.

FIGS. 2A-2E show magnitude of acceleration signals corresponding to different movements of the mobile device 100 over periods of time according to an aspect of the disclosure. Horizontal axes of FIGS. 2A-2E represent sampling points indicated by a sequence of numbers. Vertical axes of FIGS. 2A-2E represent magnitude of acceleration signals generated from the 3-axis accelerometer 110. As described above, the acceleration signals include the first signal, the second signal, and the third signal corresponding to the three axes of the 3-axis accelerometer 110. The magnitude of the acceleration signals at a sampling point describes a size of an acceleration caused by three readings of the three signals at the sampling point. In an example, the magnitude of the acceleration signals at a sampling point is calculated using the following formula, $$A_T = \sqrt{A_1^2 + A_2^2 + A_3^2},$$

where $A_T$ represents the magnitude of the acceleration signals at a sampling point, and $A_1$, $A_2$, and $A_3$ represent the readings of the three signals respectively at the sampling time point.

Figure 2A:
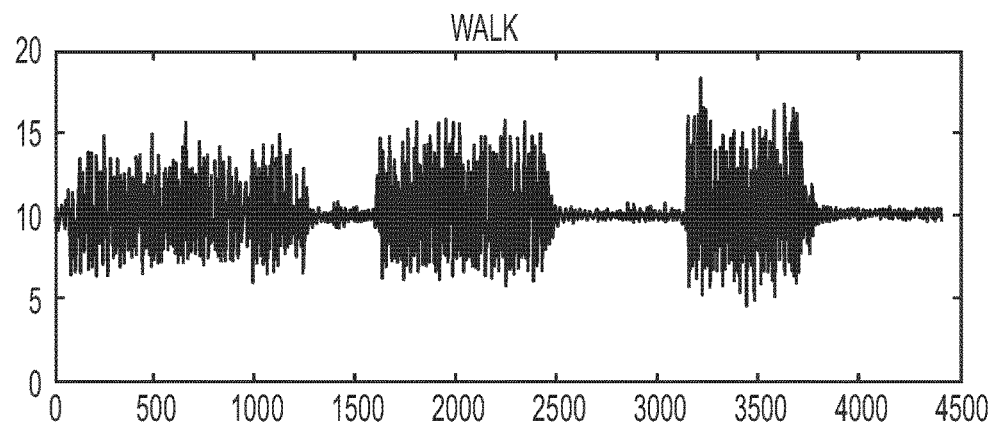
FIGS. 2A-2E show magnitude of acceleration signals corresponding to different movements of a mobile device over periods of time according to an aspect of the disclosure.
Figure 2B:
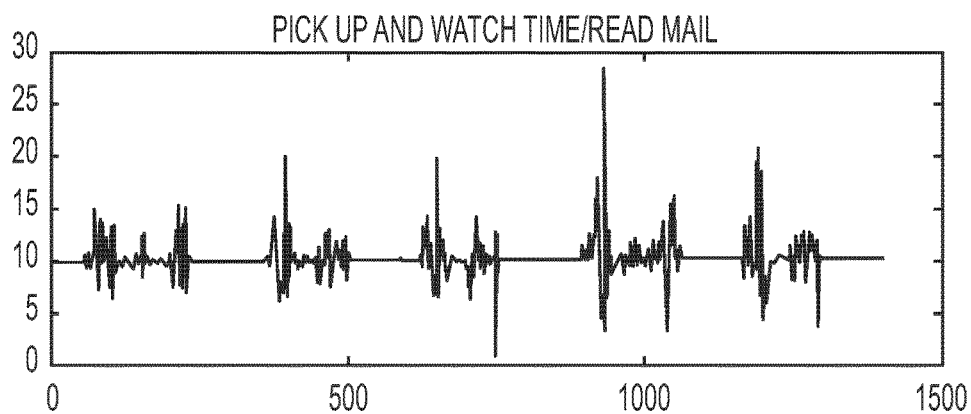
Figure 2C:
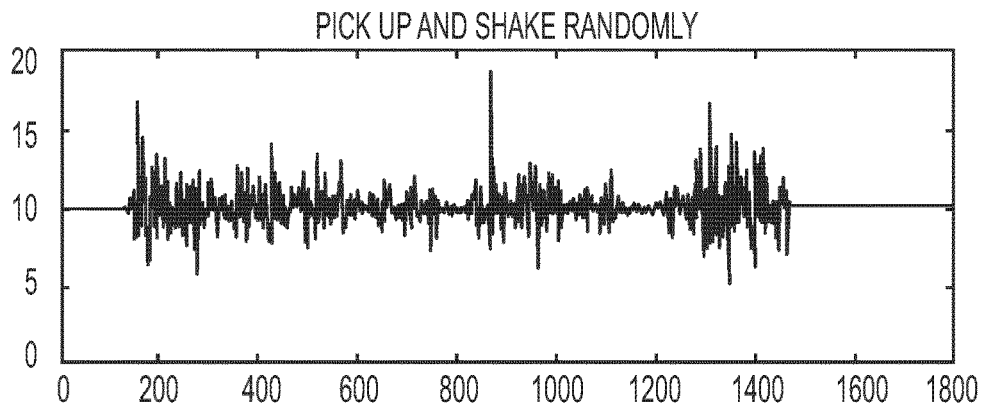
Figure 2D:
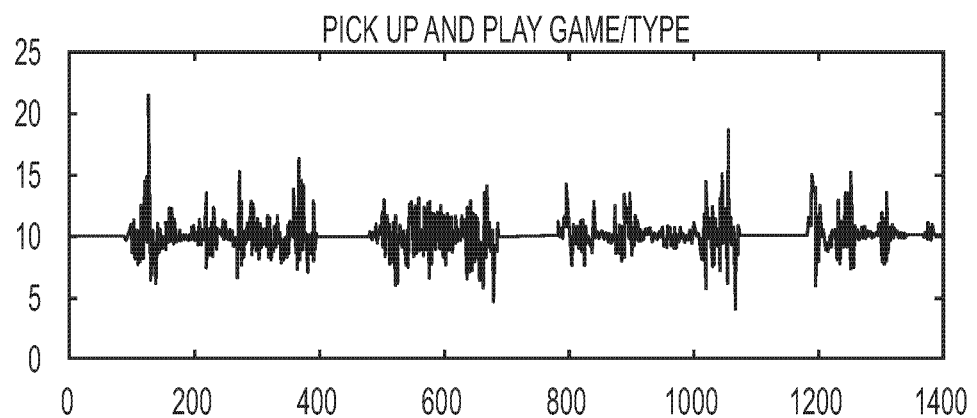
Figure 2E:
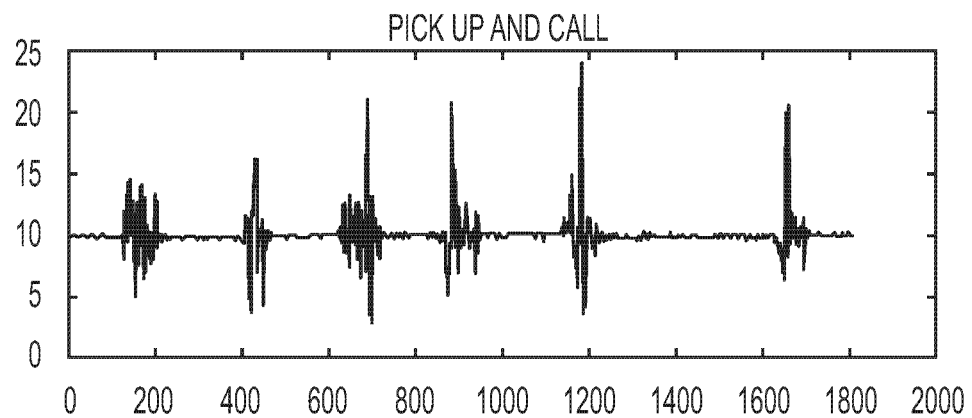

FIG. 2A shows magnitude of acceleration signals corresponding to movements of the mobile device 100 when the user walks or is motionless alternatively over a period of time. When the user is walking, the magnitude of acceleration signals has a larger amplitude than when the user is motionless. Accordingly, the movements of the mobile device 100 in FIG. 2A when the user is walking are real movements that change the geographic location of the mobile device 100. FIGS. 2B-2E corresponds to the following activities of the user who is sitting beside a table: (1) pick up the mobile device 100 and watch time/read emails, (2) pick up the mobile device 100 and shake the mobile device 100 randomly, (3) pick up the mobile device 100 and play a game/type, and (4) pick up the mobile device 100 and make a phone call. Accordingly, the movements in FIGS. 2B-2E are false movements that do not change the geographic location of the mobile device 100.

It can be observed that the magnitude of acceleration signals in FIG. 2A (corresponding to real movements) and in FIGS. 2B-2E (corresponding to false movements) demonstrate different features. For example, in FIG. 2A when the user is walking, magnitude of acceleration signals is below an acceleration of value 20, while in FIGS. 2B/2D/2E, magnitude of acceleration signals at some sampling points are above the acceleration of value 20; in FIG. 2A when the user is walking, the amplitude of the change of the magnitude of acceleration signals does not change or change slightly over time, while in FIGS. 2B-2E, the amplitude of the change of the magnitude of acceleration signals changes dramatically over time; Most of the time, the magnitude of acceleration signals in FIG. 2A is larger than in FIGS. 2B-2E.

According to an aspect of the disclosure, SD values of each of the acceleration signals, are used to reflect the features of each of the acceleration signals corresponding to a false movement or a real movement of the mobile device 100. The SD values of the acceleration signals are compared with multiple thresholds during the process of determining whether a movement of the mobile device 100 is a false movement or a real movement performed by the movement detector 126 in FIG. 1. Accordingly, whether a movement of the mobile device 100 is a false movement or a real movement can be determined based on the SD values of each of the acceleration signals and the thresholds.

According to an aspect of the disclosure, the above multiple thresholds are determined based on numerous experiments in which many acceleration data corresponding to various movements of mobile devices are collected and analyzed, and different threshold values are tested.

Figure 3:
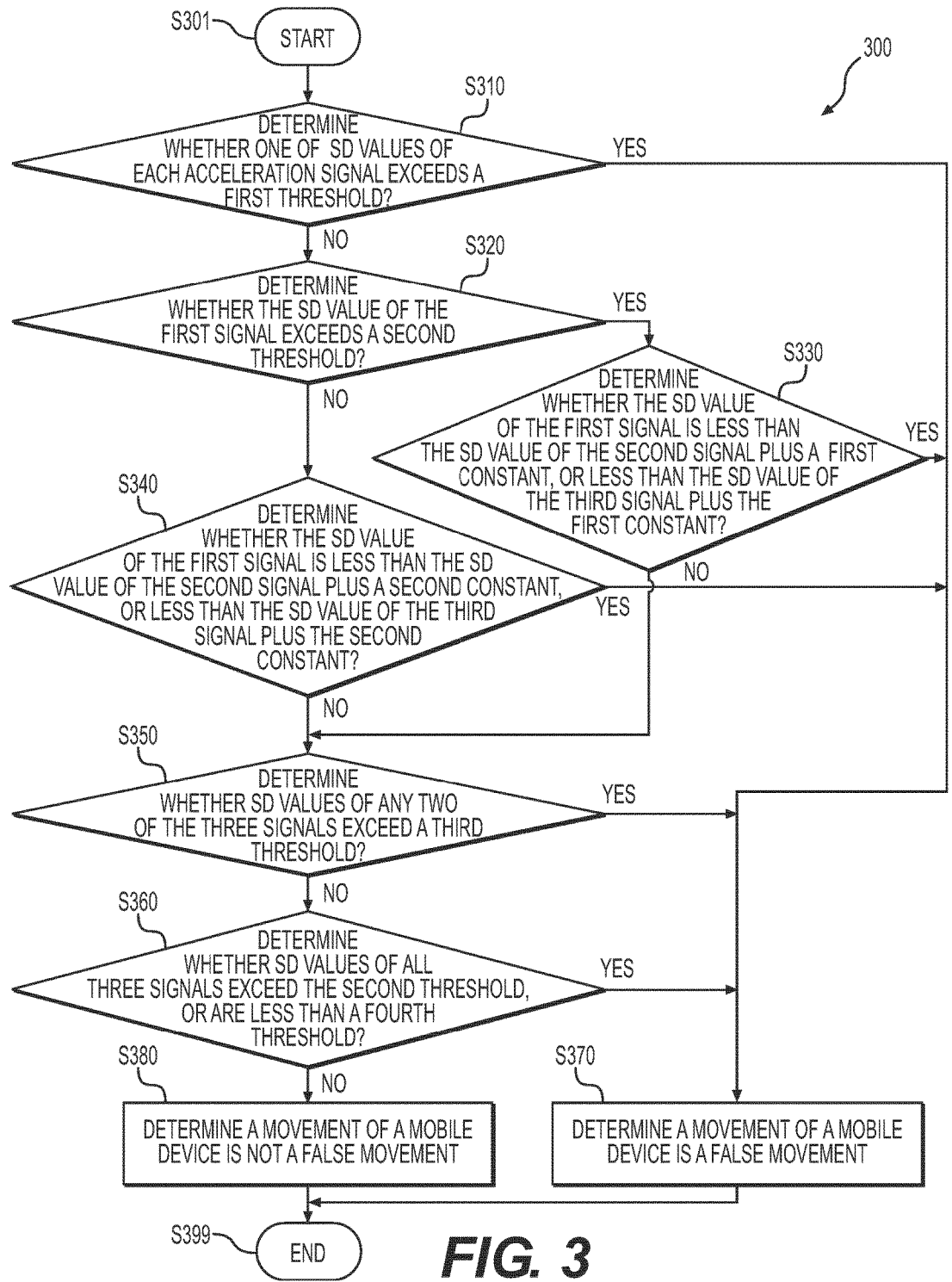
FIG. 3 shows a flowchart illustrating a process of determining whether a movement of the mobile device is a false movement or a real movement according to an embodiment of the disclosure.

FIG. 3 shows a flowchart 300 illustrating the process of determining whether the movement of the mobile device 100 indicated by the acceleration signals is a false movement or a real movement based on the SD values of each of the acceleration signals according to an embodiment of the disclosure. According to one aspect of the disclosure, the process for detecting false movement is developed using empirical research methodology. For example, different false movements (reading email, placing a call, playing a game, shaking randomly, etc.) are performed by different testers in numerous experiments, and features of different false movements are observed based on data collected from the numerous experiments. Based on the experiments and observation, the process for detecting false movement is conceived and proposed. For example, an order for performing each step in the process and the thresholds/constants used in the process are proposed. Then the proposed process is tested and optimized using the data collected and the process for detecting false movement can be finally determined.

In an embodiment, the process is performed by the movement detector 126 in FIG. 1. The process starts at S301, and proceeds to S310.

At S310, the movement detector 126 determines whether one of the SD values of each of the acceleration signals exceeds a first threshold. In an example, the first threshold can be set to an empirical value of 5, that was previously determined, for example, based on the empirical experiments. When one of the SD values of each of the acceleration signal exceeds the first threshold, the process proceeds to S370. Otherwise, the process proceeds to S320.

At S320, the movement detector 126 determines whether the SD value of the first signal in the acceleration signals exceeds a second threshold. The second threshold is less than the first threshold. In an example, the second threshold can be set to an empirical value of 2, that was previously determined, for example, based on the empirical experiments. When the SD value of the first signal exceeds the second threshold, the process proceeds to S330. Otherwise, the process proceeds to S340.

At S330, the movement detector 126 determines whether the SD value of the first signal is less than the SD value of the second signal in the acceleration signals plus a first constant, or less than the SD value of the third signal in the acceleration signals plus the first constant. In an example, the first constant can be set to an empirical value of 0.45, that was previously determined, for example, based on the empirical experiments. When the result of the determination is positive, the process proceeds to S370. Otherwise, the process proceeds to S350.

At S340, the movement detector 126 determines whether the SD value of the first signal is less than the SD value of the second signal plus a second constant, or less than the SD value of the third signal plus the second constant. In an example, the second constant can be set to an empirical value of 0.3, that was previously determined, for example, based on the empirical experiments. When the result of the determination is positive, the process proceeds to S370. Otherwise, the process proceeds to S350.

At S350, the movement detector 126 determines whether SD values of any two of the three signals exceed a third threshold. The third threshold is less than the first threshold but exceeds the second threshold. In an example, the third threshold can be set to an empirical value of 3, that was previously determined, for example, based on the empirical experiments. When the result of the determination is positive, the process proceeds to S370. Otherwise, the process proceeds to S360.

At S360, the movement detector 126 determines whether SD values of each acceleration signal all exceed the second threshold, or are less than a fourth threshold. The fourth threshold is less than the second threshold. In an example, the fourth threshold can be set to an empirical value of 1, that was previously determined, for example, based on the empirical experiments. When the result of the determination is positive, the process proceeds to S370. Otherwise, the process proceeds to S380.

At S370, the movement detector 126 determines the movement of the mobile device 100 over the window of time is false movement. The process proceeds to S399 and terminates at S399.

At S380, the movement detector 126 determines the movement of the mobile device 100 over the window of time is real movement. The process proceeds to S399 and terminates at S399.

Figure 4:
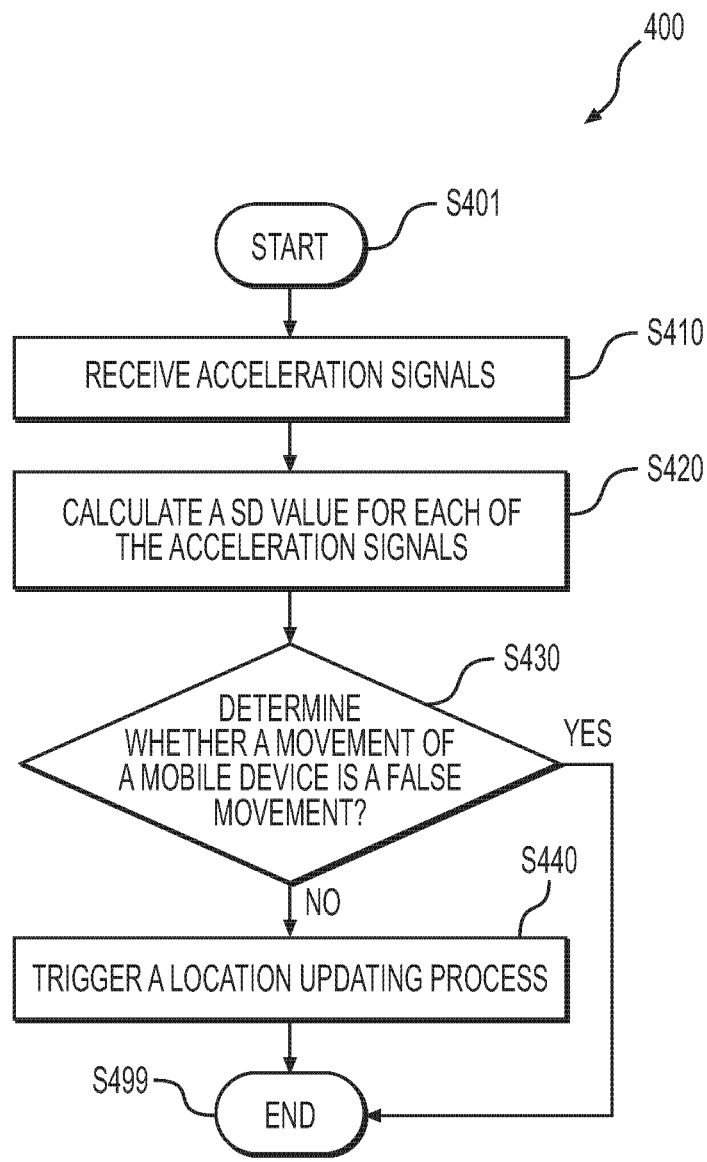
FIG. 4 shows another process for determining whether a movement of a mobile device is a real movement or a false movement according to an embodiment of the disclosure.

FIG. 4 shows a process 400 for determining whether a movement of a mobile device is a real movement or a false movement based on acceleration signals received from a 3-axis accelerometer according to an embodiment of the disclosure. The process 400 can be performed by the MDU 120 in the FIG. 1 example. The process 400 starts at S401 and proceeds to S410.

At S410, the acceleration signals that are indicative of a movement of the mobile device over a window of time are received from the 3-axis accelerometer. The acceleration signals can include a first signal, a second signal, and a third signal corresponding to three axes of the 3-axis accelerometer.

At S420, SD values of each of the acceleration signals over the window of time are calculated. The acceleration signals can first be converted from analog signals to acceleration data. Then, the acceleration data can be filtered to remove high frequency components from the acceleration data. Subsequently, the SD values of each of the acceleration signals can be calculated based on the acceleration data.

At S430, whether the movement of the mobile device is a false movement or a real movement is determined based on the SD values of each of the acceleration signals calculated at S420. In an example, the process described with reference to FIG. 3 is performed to determine whether the movement of the mobile device is a false movement or a real movement. When the movement of the mobile device is a false movement, the process 400 proceeds to S499 and terminates at S499. Otherwise, the process 400 proceeds to S440.

At S440, a location updating process is triggered. For example, the location updating controller 130 can be triggered to perform the location updating process for the mobile device.

While aspects of the present disclosure have been described in conjunction with the specific embodiments thereof that are proposed as examples, alternatives, modifications, and variations to the examples may be made.

Accordingly, embodiments as set forth herein are intended to be illustrative and not limiting. There are changes that may be made without departing from the scope of the claims set forth below.

What is claimed is:

1. A method, comprising:
receiving acceleration signals from a 3-axis accelerometer of a mobile device that are indicative of a movement of the mobile device over a window of time, the acceleration signals including a first signal, a second signal, and a third signal corresponding to three axes of the 3-axis accelerometer;
calculating a standard deviation (SD) value for each of the acceleration signals over the window of time;
determining whether the movement of the mobile device is a false movement based on the calculated SD values, wherein the false movement is a movement that does not substantially change a geographic location of the mobile device, and wherein determining whether the movement of the mobile device is the false movement based on the calculated SD values includes:
determining whether at least one of the calculated SD values exceeds a first threshold; and
when at least one of the calculated SD values exceeds the first threshold, identifying the movement of the mobile device as the false movement; and
when the movement of the mobile device is not a false movement, triggering a location updating process for the mobile device.

2. The method of claim 1, wherein determining whether the movement of the mobile device is the false movement based on the calculated SD values further includes:
when none of the calculated SD values exceeds the first threshold, determining whether a SD value of the first signal exceeds a second threshold, the second threshold being less than the first threshold;
when the SD value of the first signal exceeds the second threshold,
determining whether the SD value of the first signal is less than a SD value of the second signal plus a first constant, or less than a SD value of the third signal plus the first constant, and
when the SD value of the first signal is less than the SD value of the second signal plus the first constant, or less than the SD value of the third signal plus the first constant, identifying the movement of the mobile device as the false movement; and
when the SD value of the first signal is less than the second threshold,
determining whether the SD value of the first signal is less than the SD value of the second signal plus a second constant, or less than the SD value of the third signal plus the second constant, and
when the SD value of the first signal is less than the SD value of the second signal plus the second constant, or less than the SD value of the third signal plus the second constant, identifying the movement of the mobile device as the false movement.

3. The method of claim 2, wherein determining whether the movement of the mobile device is the false movement based on the calculated SD values further includes:
when the SD value of the first signal exceeds the SD value of the second signal plus the first constant, and exceeds the SD value of the third signal plus the first constant, or when the SD value of the first signal exceeds the SD value of the second signal plus the second constant, and exceeds the SD value of the third signal plus the second constant,
    determining whether the SD values of any two of the acceleration signals exceed a third threshold, the third threshold is less than the first threshold but exceeds the second threshold, and
    when the SD values of any two of the acceleration signals exceed a third threshold, identifying the movement of the mobile device as the false movement.

4. The method of claim 3, wherein determining whether the movement of the mobile device is false movement based on the calculated SD values further includes:
    when at least one of the SD values of every two of the acceleration signals do not exceed the third threshold,
        determining whether the calculated SD values all exceed the second threshold, or are less than a fourth threshold, the fourth threshold is less than the second threshold,
        when the calculated SD values all exceed the second threshold, or are less than the fourth threshold, identifying the movement of the mobile device as the false movement, and
        when not all of the calculated SD values exceed the second threshold, and not all of the calculated SD values are less than the fourth threshold, identifying the movement of the mobile device as not false movement.

5. The method of claim 1, wherein calculating the standard deviation (SD) value for each of the acceleration signals includes:
    converting the acceleration signals from analog signals to acceleration data;
    filtering the acceleration data to generate filtered acceleration data; and
    calculating SD values for each of the acceleration signals based on the filtered acceleration data.

6. The method of claim 1, further comprising:
    monitoring the acceleration signals to detect the movement of the mobile device; and
    when the movement of the mobile device is detected, initiating a process for determining whether the movement of the mobile device is false movement.

7. A device, comprising:
    a digital signal processing circuit configured to,
        receive acceleration signals from a 3-axis accelerometer of a mobile device that are indicative of a movement of the mobile device over a window of time, and
        calculate a standard deviation (SD) value for each of the acceleration signals over the window of time, the acceleration signals including a first signal, a second signal, and a third signal corresponding to three axes of the 3-axis accelerometer; and
    a movement detector circuit configured to,
        determine whether at least one of the calculated SD values exceeds a first threshold, and when at least one of the calculated SD values exceeds the first threshold, identify the movement of the mobile device as a false movement, wherein the false movement is a movement that does not substantially change a geographic location of the mobile device, and
        when the movement of the mobile device is not a false movement, trigger a location updating process for the mobile device.

8. The device of claim 7, wherein the movement detector circuit is further configured to,
    when none of the calculated SD values exceeds the first threshold, determine whether a SD value of the first signal exceeds a second threshold, the second threshold being less than the first threshold,
    when the SD value of the first signal exceeds the second threshold,
        determine whether the SD value of the first signal is less than a SD value of the second signal plus a first constant, or less than a SD value of the third signal plus the first constant, and
        when the SD value of the first signal is less than the SD value of the second signal plus the first constant, or less than the SD value of the third signal plus the first constant, identify the movement of the mobile device as the false movement, and
    when the SD value of the first signal is less than the second threshold,
        determine whether the SD value of the first signal is less than the SD value of the second signal plus a second constant, or less than the SD value of the third signal plus the second constant, and
        when the SD value of the first signal is less than the SD value of the second signal plus the second constant, or less than the SD value of the third signal plus the second constant, identify the movement of the mobile device as the false movement.

9. The device of claim 8, wherein the movement detector circuit is further configured to,
    when the SD value of the first signal exceeds the SD value of the second signal plus the first constant, and exceeds the SD value of the third signal plus the first constant, or
    when the SD value of the first signal exceeds the SD value of the second signal plus the second constant, and exceeds the SD value of the third signal plus the second constant,
        determine whether the SD values of any two of the acceleration signals exceed a third threshold, the third threshold is less than the first threshold but exceeds the second threshold, and
        when the SD values of any two of the acceleration signals exceed a third threshold, identify the movement of the mobile device as the false movement.

10. The device of claim 9, wherein the movement detector circuit is further configured to,
    when at least one of the SD values of every two of the acceleration signals do not exceed the third threshold,
        determine whether the calculated SD values all exceed the second threshold, or are less than a fourth threshold, the fourth threshold is less than the second threshold,
        when the calculated SD values all exceed the second threshold, or are less than the fourth threshold, identify the movement of the mobile device as the false movement, and
        when not all of the calculated SD values exceed the second threshold, and not all of the calculated SD values are less the fourth threshold, identify the movement of the mobile device as not false movement.

11. The device of claim 7, wherein the digital signal processing circuit is further configured to, convert the acceleration signals from analog signals to acceleration data, filter the acceleration data to generate filtered acceleration data, and calculate SD values for each of the acceleration signals based on the filtered acceleration data.

12. The device of claim 7, further comprising:

a movement monitor circuit configured to monitor the acceleration signals to detect the movement of the mobile device, and, when the movement of the mobile device is detected, initiate a process for determining whether the movement of the mobile device is false movement.

13. A mobile device, comprising:

a 3-axis accelerometer configured to generate acceleration signals that are indicative of a movement of the mobile device over a window of time;

a digital signal processing circuit configured to,
  receive acceleration signals from a 3-axis accelerometer of a mobile device that are indicative of a movement of the mobile device over a window of time, and
  calculate a standard deviation (SD) value for each of the acceleration signals over the window of time, the acceleration signals including a first signal, a second signal, and a third signal corresponding to three axes of the 3-axis accelerometer; and a movement detector circuit configured to,
  determine whether at least one of the calculated SD values exceeds a first threshold, and when at least one of the calculated SD values exceeds the first threshold, identify whether the movement of the mobile device as a false movement, wherein the false movement is a movement that does not substantially change a geographic location of the mobile device, and
  when the movement of the mobile device is not a false movement, trigger a location updating process for the mobile device, a location updating controller circuit configured to perform the location updating process when triggered by the movement detector circuit; and positioning circuitry configured to determine a current location of the mobile device when triggered by the location updating controller.

14. The mobile device of claim 13, wherein the movement detector circuit is further configured to, when none of the calculated SD values exceeds the first threshold, determine whether a SD value of the first signal exceeds a second threshold, the second threshold being less than the first threshold, when the SD value of the first signal exceeds the second threshold,
  determine whether the SD value of the first signal is less than a SD value of the second signal plus a first constant, or less than a SD value of the third signal plus the first constant, and
  when the SD value of the first signal is less than the SD value of the second signal plus the first constant, or less than the SD value of the third signal plus the first constant, identify the movement of the mobile device as the false movement, and when the SD value of the first signal is less than the second threshold,
  determine whether the SD value of the first signal is less than the SD value of the second signal plus a second constant, or less than the SD value of the third signal plus the second constant, and
  when the SD value of the first signal is less than the SD value of the second signal plus the second constant, or less than the SD value of the third signal plus the second constant, identify the movement of the mobile device as the false movement.

15. The mobile device of claim 14, wherein the movement detector circuit is further configured to, when the SD value of the first signal exceeds the SD value of the second signal plus the first constant, and exceeds the SD value of the third signal plus the first constant, or when the SD value of the first signal exceeds the SD value of the second signal plus the second constant, and exceeds the SD value of the third signal plus the second constant,
  determine whether the SD values of any two of the acceleration signals exceed a third threshold, the third threshold is less than the first threshold but exceeds the second threshold, and
  when the SD values of any two of the acceleration signals exceed a third threshold, identify the movement of the mobile device as the false movement.

16. The mobile device of claim 15, wherein the movement detector circuit is further configured to, when at least one of the SD values of every two of the acceleration signals do not exceed the third threshold,
  determine whether the calculated SD values all exceed the second threshold, or are less than a fourth threshold, the fourth threshold is less than the second threshold,
  when the calculated SD values all exceed the second threshold, or are less than the fourth threshold, identify the movement of the mobile device as the false movement, and
  when not all of the calculated SD values exceed the second threshold, and not all of the calculated SD values are less than the fourth threshold, identify the movement of the mobile device as not false movement.

* * * * *